July 27, 1943.  C. S. CRAKES  2,325,175

SIREN

Filed Sept. 23, 1940

INVENTOR
CLARENCE S. CRAKES

BY Boyken & Mohler

ATTORNEYS

Patented July 27, 1943

2,325,175

UNITED STATES PATENT OFFICE 2,325,175

SIREN

Clarence S. Crakes, Santa Maria, Calif.

Application September 23, 1940, Serial No. 357,877

7 Claims. (Cl. 116—58)

This invention relates to sirens in general, and more specifically to a drive for a conventional siren and mounting arrangement therefor.

One of the objects of the invention is an improved arrangement for driving a siren in a manner more efficiently than heretofore, and which arrangement also enables installing the siren and its driving mechanism on an automobile in a position out of interference with other elements of the automobile engine for driving by power from said engine through a mechanical connection therewith.

Another object is an attachment adapted to be quickly mounted on a conventional automobile engine under the hood of the automobile, and which attachment is adapted to be secured in position by means on said engine without the necessity of rearranging or altering existing parts on the engine.

Other objects and advantages will appear in the description and drawing.

Briefly described, my invention comprises a mechanically actuated siren provided with means for quickly attaching the same, including power transmitting means, to an automobile engine, with said power transmitting means positioned to be, as desired, moved into frictional driving relation with a solidly supported driving surface, as distinguished from prior attempts to establish a driving connection between a yieldable length of the fan belt, or the like. Also, my invention includes the arrangement of the siren and the power transmitting means for the rotor of such siren, in a position, where any sized siren that can be placed under the engine hood of an automobile may be installed quickly and without altering the automobile construction.

This invention is particularly concerned with modern sirens in which the sound is produced by intermittently cutting off the flow of air induced by the siren rotor by elements on said rotor. These sirens are commonly used on police cars, ambulances, fire fighting vehicles, and the like, and the diameters of the rotors are relatively large, hence, it has heretofore been deemed necessary to either install such sirens outside the engine hood or to specially provide for their installation under the hood, in which latter case, the rotors are driven by an electric motor provided for that specific purpose, or a special driving connection is maintained with a power take-off, with special clutch means or the like employed to establish the driving connection. Light and easily driven mechanical horns or sound making devices have been arranged for driving by a yieldable length of the fan belt, but such arrangement is of no value for driving the rotors of conventional sirens of the type I use. With my invention, the use of special electric motors, clutches and constantly running parts, is eliminated, and my device is readily installed on any conventional automobile engine, below the hood, where it is protected from road dirt and other undesirable impurities, and the power transmitting means to rotor, while being a friction drive, is, from a practical standpoint, positive and reliable.

Figure 1:
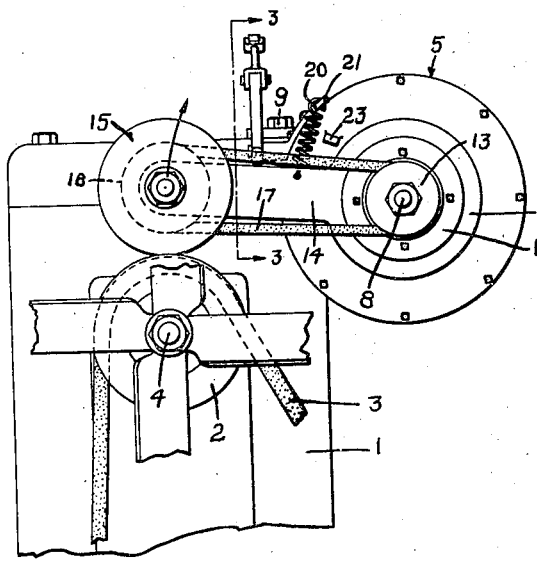
Fig. 1 is an elevational view of my invention on the front end of an automobile engine as seen looking toward said end.
Figure 4:
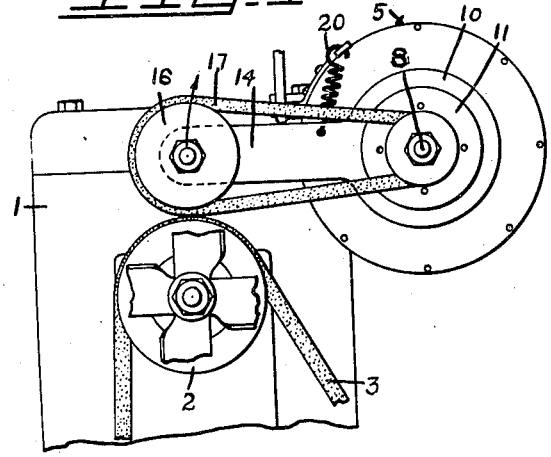
Fig. 4 is an elevational view of my invention in a slightly different form from that shown in Fig. 1, as seen looking toward the front end of an automobile engine.

In the drawing, the front of an automobile engine is indicated at 1, (Figs. 1, 4). Mounted on said front end is the conventional fan pulley 2 over which extends the usual fan belt 3, which fan belt may extend in the usual manner downwardly over a pulley on the crank shaft and over the generator pulley (not shown). The fan belt pulley is mounted on shaft 4, for rotation, which shaft is rigidly secured in position, although it may be loosened for replacing the fan belt, after which, it is again secured in rigid fixed position.

The fan belt 3 is generally a V-belt and is formed to follow a fixed path of travel over the engine driven pulley, or over such latter pulley and a generator pulley. For this reason, any flexing of the lengths of the belt between pulleys, such as by application of a friction disk or pulley between the standard pulleys, and against the belt, is injurious to the latter, particularly where an attempt is made to effect driving of a relatively heavy load, such as a siren rotor, from a frictional engagement with such lengths. Also, such frictional engagement as results from such attempt, is unreliable, due to the yielding of the belt. Furthermore, there is little, if any room below the level of fan belt pulley and between the fan and radiator for a siren, although there is ordinarily ample room in the area above the level of the fan belt pulley and to the sides of the latter, for a siren.

Figure 2:
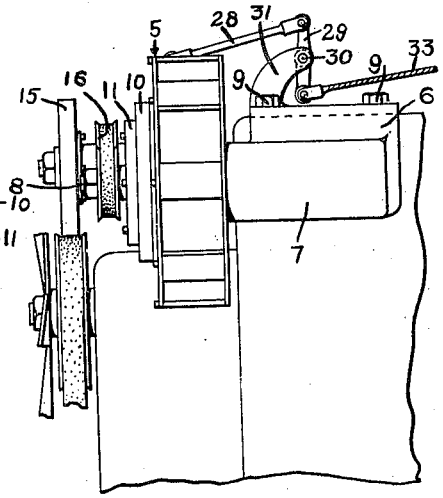
Fig. 2 is an elevational view of the invention as seen from a position at right angles to the view of Fig. 1.
Figure 3:
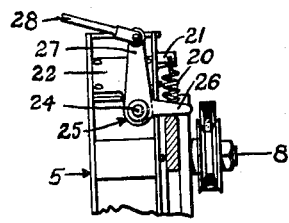
Fig. 3 is a fragmentary sectional view as seen from line 3—3 of Fig. 1.

My siren, designated 5, is preferably secured to the engine 1 by a bracket 6, which bracket carries the bearings 7 at one end of the rotor shaft 8 and supports the rotor and its rigid cylindrical housing, in a position in front of the engine and at a level above the level of the axis of the fan belt pulley. This bracket may be secured in position by cylinder head bolts 9, as indicated in Fig. 2, or it may obviously be formed for securement to any nearby bolts that are accessible.

On the front side of the housing, and concentric with the rotor axis is a ring 10 retained in position by an annular retaining and bearing plate 11 for revolving about the rotor axis, the latter projecting centrally through the concentric central openings in ring 10 and plate 11 to outside the forwardly facing side of the siren. The forwardly projecting end of the rotor shaft 8 has a pulley 13 secured thereto.

The ring 11 carries an arm 14 extending radially outwardly therefrom to a position in which the outer end of said arm is substantially directly over the fan pulley 2. The outer end of arm 14 carries a bearing rotatably supporting a circular friction disk 15 coplanar with the fan pulley 2 and directly over the latter. This friction pulley also carries a pulley 16 co-axial therewith. A belt 17 extends over rotor pulley 13 and disk pulley 16. The periphery of disk 15 with which the latter pulley is connected is positioned to engage the back of the fan belt 3 where the latter is in tight engagement with the pulley 2. Arm 14 swings about the axis of shaft 12 at its inner end, hence the disk 15 may be swung upwardly away from the pulley 2 and downwardly to engagement with the back of belt 3 without varying the tension on belt 17. The arm 14 is normally held in elevated position in which disk 15 is spaced above belt 3, by a relatively strong coil spring 20 connecting between arm 14 and an ear 21 on a bracket 22 that is secured to the rotor housing. This spring holds the arm against a stop 23 on the rotor housing (Fig. 1).

The bracket 22 also carries a shaft 24 on which is mounted a crank 25, one arm 26 of which engages generally horizontally over the upper edge of arm 14 and the other arm 27 of which extends vertically upwardly. To the upper end of the arm 27 is pivoted a link 28 (Fig. 2) that pivotally connects at its opposite end with the upper end of a bar 29, which bar is pivoted at 30, intermediate its ends to a bracket 31 carried on bracket 6. The lower end of bar 29 connects to one end of a cable 33 that may extend to the driver in the driver's seat of the automobile. Upon pulling cable 33 the arm 26 of the crank forcibly swings arm 14 downwardly to cause tight frictional engagement between disk 15 and the back of belt 3.

The above described means for moving disk 15 into engagement with belt 3 is merely illustrative of one means that may be employed, and is not intended to be restrictive to said means, but it is desirable that whatever means is used, the operation thereof should effect a tight frictional engagement between said disk and belt. When the pull on cable 33 is released, it is obvious that the disk 15 will be automatically drawn away from belt 3 by spring 20.

Figure 5:
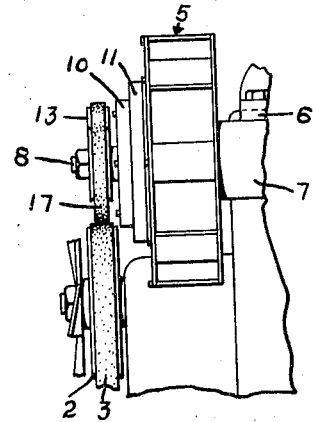
Fig. 5 is an elevational view of the invention illustrated in Fig. 4 as seen from a position at right angles to Fig. 4.

In Figs. 4, 5, the same arm 14 and other elements for swinging said arm are employed, hence the description thereof will not be repeated, and the same numbers are used to designate parts similar in structure to those already described.

The principal difference between the device of Figs. 1, 2 and Figs. 4, 5, is that the device illustrated in the latter two figures, eliminates the friction disk 15. Instead, the belt 17 connecting between the rotor pulley 13 and pulley 16 engages directly with belt 3 on the fan belt pulley 2, the engagement being made where belt 17 is in firm engagement with pulley 16. Belt 17, in Fig. 4, may be a standard industrial belt or it may be formed with a special friction back to give where use is very frequent, in order to overcome any possible tendency to polish or to result in excessive wear. The elimination of the friction disk, provides not only for greater economy in manufacture, but also reduces the over-all depth of the assembly in direction longitudinally of the automobile, thus enabling installation of the siren in an automobile where there would otherwise be a lack of adequate space.

It is important to observe that the problems here solved are not to be confused with those problems that exist where small and easily actuaetd mechanical horns have been used. Automobile sirens of the character herein described require considerable power for their operation and such power is not available by mere frictional engagement with an unsupported length of the fan belt without injury to the belt. Since the instant invention does not alter the present automobile structure, and is readily installed by use of those elements already present in an automobile engine, it may be classed as an attachment in addition to being a new arrangement in combination with an automobile engine.

Having described my invention, I claim:

1. A siren attachment for an automobile engine that is provided with a fan-pulley and fan-belt on said pulley comprising: a siren assembly including a housing, a siren rotor therein and a friction drive device connected with said rotor arranged and adapted to be driven upon frictional engagement between friction drive means, said device and said fan-belt for causing rotation of said rotor, said friction drive device comprising a first pulley on said rotor, a second pulley, an endless belt connecting between said first pulley and said second pulley, means rotatably supporting said second pulley for rotation on its central axis and for revolvable movement about the central axis of said first pulley, a bracket supporting said siren assembly as a unit for securement to said engine in a position with said second pulley adjacent said fan-belt, means for so securing said bracket to said engine for supporting said siren assembly in said position, and friction drive means in driving connection with said second pulley adapted to frictionally engage said fan-belt at a point on the latter where the fan-belt is supported on said fan-pulley when said bracket is secured to said engine and said siren assembly is in said position, said friction drive means being movable with said second pulley about said axis of said first pulley whereby said friction drive means may be moved into and out of position engaging said fan belt.

2. In a construction as defined in claim 1, said friction drive means comprising the portion of said endless belt that extends over said second pulley.

3. A siren attachment for an automobile engine that is provided with a fan-pulley and a fan-belt on said pulley, comprising: a mounting bracket, a siren assembly carried by said bracket, said siren assembly comprising a siren including a rotor therein and a rotary friction member connected with said rotor for revolving the latter upon frictional engagement between said member and said fan belt, means for securing said bracket with said siren assembly rigid thereon in a position on said engine with said member in frictional engagement with said fan belt at a point where said fan belt is in driving engagement with said fan-pulley, means for moving said member relative to said rotor and bracket into and out of engagement with said fan-belt, and means supporting said member for said movement.

4. In a construction as defined in claim 3, said member comprising an annular disk having a first pulley secured thereto for rotation therewith, a second pulley secured to said rotor, and an endless drive belt connecting between said first pulley and said second pulley.

5. A siren attachment for an automobile engine that is provided with a fan-pulley and a fan belt thereon, comprising: a bracket arranged and adapted to be rigidly secured to an automobile engine; a siren housing having a rotatable rotor therein stationarily secured to said bracket; an arm pivotally secured to said siren for swinging about the axis of rotation of said rotor; a rotary drive member carried by said arm at its end remote from said siren connected with said rotor for rotation of the latter upon rotation of said drive member; means for swinging said arm with said drive member thereon about said axis; said bracket being arranged and adapted for securement to said engine in a position in which said drive member during said swinging thereof will engage the said fan belt at a point where the latter is supported against said fan-pulley; and means connecting between said drive member and said rotor, including an endless belt arranged and adapted to swing about said axis of said rotor when said arm is swung about said axis.

6. In a construction as defined in claim 5, said rotary drive member including a pulley supporting one end of said endless belt; and a pulley secured to said rotor concentric with said axis supporting the opposite end of said belt.

7. In a construction as defined in claim 5, said rotary drive member including a pulley supporting one end of said endless belt; a pulley secured to rotor concentric with said axis supporting the opposite end of said belt; and said endless belt projecting radially outwardly of the first mentioned pulley, whereby said endless belt at said pulley may engage the fan belt to be frictionally driven by said fan belt.

CLARENCE S. CRAKES.